March 7, 1967  C. E. FLOREN  3,307,435
PLASTIC SERVICE T

Original Filed June 21, 1963  2 Sheets-Sheet 1

INVENTOR
CARL E. FLOREN
BY
Cushman, Darby & Cushman
ATTORNEYS

March 7, 1967  C. E. FLOREN  3,307,435
PLASTIC SERVICE T
Original Filed June 21, 1963
2 Sheets-Sheet 2
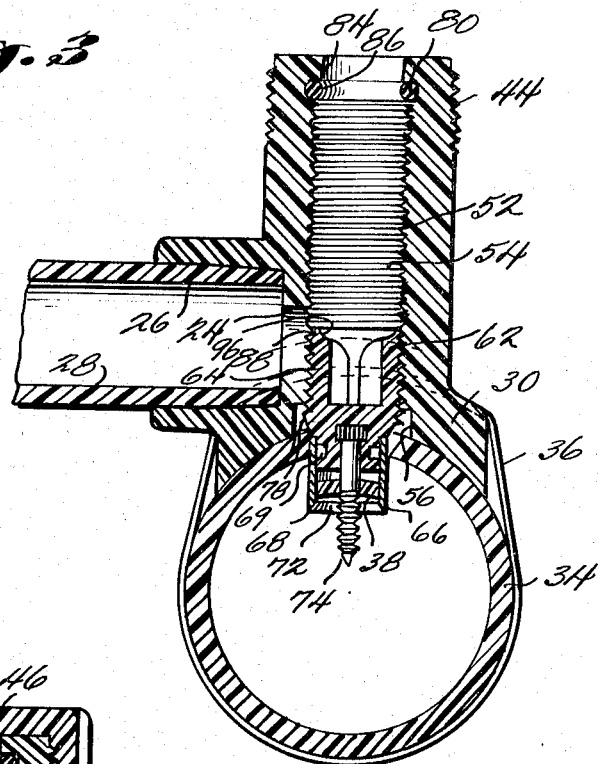
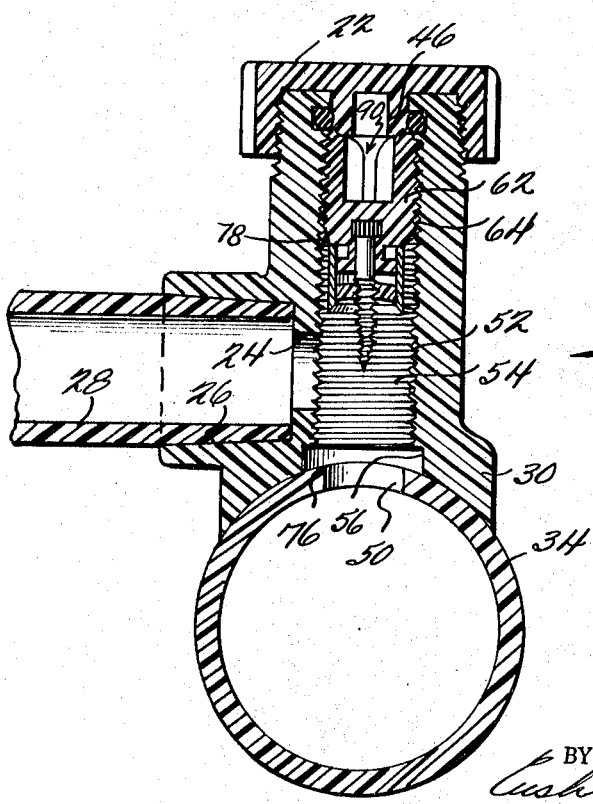
INVENTOR
CARL E. FLOREN
BY
Cushman, Darby & Cushman
ATTORNEYS 3,307,435
PLASTIC SERVICE T
Carl E. Floren, Decatur, Ill., assignor to Mueller Co., Decatur, Ill., a corporation of Illinois
Continuation of abandoned application Ser. No. 289,610, June 21, 1963. This application May 2, 1966, Ser. No. 547,131
2 Claims. (Cl. 77—42)

This application is a continuation of my application Serial No. 289,610, filed June 21, 1963, now abandoned.

This invention relates to improvements in plastic service T's. More particularly, this invention relates to improvements in plastic service T's adapted for attachment to plastic mains carrying fluid under pressure and for connecting plastic service pipes to such mains without escape of the fluid to the atmosphere.

Plastic mains for transporting fluids under pressure and particularly plastic mains for gas distribution, and plastic service pipes running from such mains into consumers' dwellings, have relatively recently come into use. The employment of such plastic mains involves the problem of connecting service pipes thereto when the main itself is already in service or in an "active" condition. It is obviously desirable to make the connection of a service pipe to a plastic main without any escape of fluid to the atmosphere, and this is particularly important when the main carries gas, the escape of which would create a hazardous condition. More recently, the problem has become even more acute, due principally to the increasing use of higher pressures in plastic gas mains.

Plastic service and tapping T's for connecting plastic service pipes to plastic mains, when the latter are in service, have been developed and are presently in use by utilities, and by construction and building tradesmen. In the past, these T's have not been entirely satisfactory because of appreciable leakage of fluid from the main to the atmosphere during the connecting operation. Although such leakage has been relatively small, in the case of gas, any leakage whatever obviously creates a potentially hazardous situation. Further, prior art plastic service and tapping T's have allowed chips and cuttings to fall into mains during the tapping operation. Such debris has been found highly undesirable in mains, since it may clog valves in the main or enter service lines and clog consumers' valves or burners. Additionally, known service T's for attachment to plastic mains have had no means for shutoff in the event that repairs to the service lines may be necessary.

A plastic service T adapted to be attached to a plastic main by solvent welding thereto, and intended to solve the foregoing problems, is disclosed in United States Patent No. 2,839,075. While this T has met with marked commercial success and has proven to be most practical for its intended use, it is susceptible of improvements. In particular, several constructional features of this known service T have been found objectionable in practice.

A principal disadvantage has arisen, since due primarily to its design features, the constructional materials employed in making this known service T are limited to essentially dissoluble thermoplastic type materials that are highly amenable to solvent weldings. For example, a particular selection of weldable plastics and solvents is usually necessary for completing the installation of the upper "O-ring" seal or retainer washer of such T prior to usage, thus limiting known service T's to readily and easily dissoluble thermoplastic materials that are often known for structural weakness and do not possess highest known resistances to fracture. In the past, fracture has been common along the retainer washer weld line.

Procedural difficulties arise with the known construction since the O-ring seal must be installed with sufficient care, skill and precision to prevent fluid loss and leaks due to alignment mistakes because this retainer washer is the final seal during tapping to prevent gas escape to the atmosphere. Alignment mistakes are of course generally not correctable after solvent welding due to the nature of the plastic employed, and the relatively permanent "set" achieved by the welding solvent used. By virtue of the known O-ring retainer washer assembly, it has also not been possible in the past to employ an O-ring of sufficiently large cross-section to eliminate the tendency which O-rings presently employed have to be pushed into the threaded throughbore when in frictional contact with the tapping tool.

Several important manufacturing and installation diffiulties have also arisen with the service T structure of U.S. Patent No. 2,839,075, due to the use of the internal shoulder at the bottom of the throughbore for limiting the lower travel of the interior cutter plug.

Following molding of the known T, it has been necessary to run a tap therethrough to finish the interior throughbore threads because of differential shrinkage of the thermoplastic material of the T in the molding operation due to varying wall thicknesses, etc. As normally molded now, the tap is run in through the top of the T to leave the lower shoulder, above described. The tap often accomplishes no cutting at the top of the throughbore. At the bottom of the T, however, the aforementioned shrinkage causes diameter and lead changes. Hence, the tap cuts away the throughbore thread in the area where the strongest thread is desired to provide support for the cutter plug in the known T when it is under heaviest load during the actual tapping of a plastic main.

The shoulder at the T base also creates a problem during solvent welding installation onto plastic mains. Excess welding solvent, and plastic from the T and main softened thereby, are commonly squeezed out from the solvent welding operation along the line formed by the intersection of the tapping T bottom with the plastic main surface. These softened materials have no designated place in which to expand, and on hardening commonly interfere with the throughbore and cutter movement after welding installation has been completed. With this known construction, welding solvent must be applied in a very precise amount, that is, in amount sufficient to provide a strong weld and complete fluid seal, but insufficient to be squeezed out and gather in the throughbore. Such precision is often a handicap in the building trades where time must be conserved, and in the past, solvent has often been inadverently squeezed into the lower end of the throughbore and onto the threads, thus partially dissolving and weakening the threads at the T base.

Installation of this known T has also been a time-consuming and tedious problem since a mechanic or fitter must manually and precisely position the T on the plastic main immediately after the wet and slippery solvent has been applied to the curved surface of the main. Prior to and during this time of applying solvent and positioning the T thereon the installer must avoid the hazard of having cutter plug thread lubricant flow on, drip onto or wet either the under surface of the T or the upper surface of the main, such that the surfaces to be solvent welded are not rendered substantially inert to solvent welding due to the presence of lubricant, and that the lubricant does not cause the solvent to migrate away from the surface to be solvent welded. Both of these instances commonly occur with this known T due to the lower internal shoulder which enables cutter plug lubricant to be squeezed out of the throughbore due to the tight fit therein. Lubricant on the surfaces to be welded will of course inhibit and possibly prevent the production of a leakproof seal.

The manual positioning operation presently employed is also objectionable from cost and precision standpoints since the installer must hold the T securely in place on the solvent coated main surface until welding is complete, since it is very easy to permit the T to slip and slide before the solvent weld has set, and thereby cause solvent to be squeezed into the throughbore area. The care required of course increases consumtion of valuable labor hours and increases the possible margin of human error.

Accordingly, it is an object of this invention to provide an improved plastic service and tapping T for connecting plastic service pipes to plastic mains while preventing the escape of fluid from the main to the atmosphere.

It is another object of this invention to provide an improved plastic service T with improved means for shutting off the flow of fluid therethrough, and for positively preventing chips or cuttings from falling into mains as a result of tapping operations.

It is still another object of this invention to provide an improved plastic service T with improved fluid seals for safe long life use of such T's.

It is a further object of this invention to provide plastic service and tapping T's with improved manufacturing and installational features for connection to gas mains in an active condition and overcome prior art plastic service T defects.

Other objects and advantages of the invention will become apparent from the following description and accompanying drawings in which:

FIGURE 3 is a vertical sectional view taken along line 3—3 of FIGURE 2 and showing the position of the parts immediately after the main has been tapped; and FIGURE 4 is a view corresponding to FIGURE 3, but illustrating the position of the parts following completion of the tapping operation, and showing a closure cap installed on the T.

Figure 1:
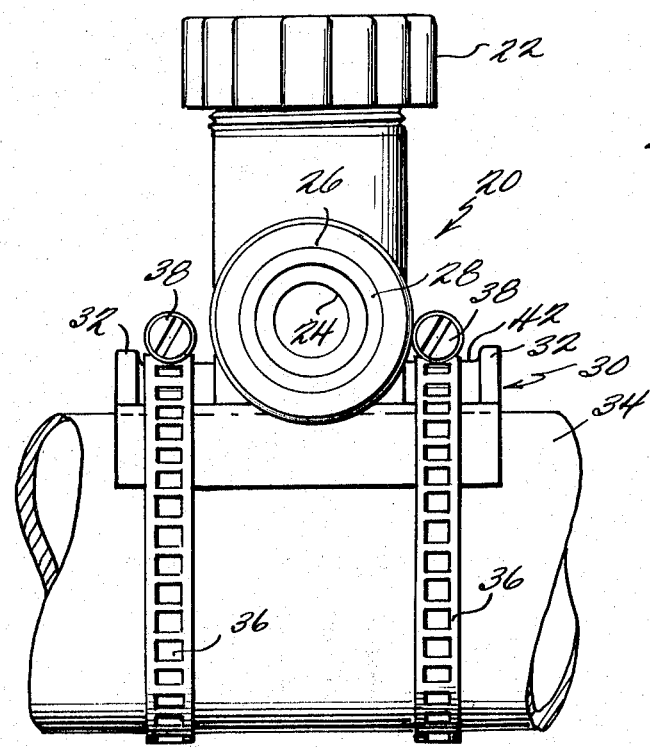
FIGURE 1 is a front elevation of a service T according to this invention showing the same secured to a plastic main.
Figure 2:
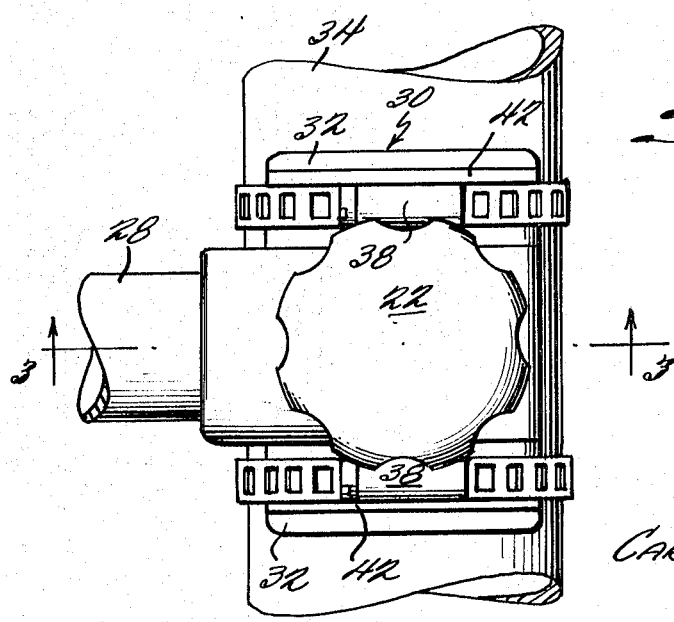
FIGURE 2 is a top view of the service T shown in FIGURE 1.

Referring now to FIGURES 1 and 2 of the drawings, there is shown a service T generally indicated at 20 which embodies this invention, and which may be formed from various plastic materials known in the art as discussed hereinafter. The service T 20 is provided with a cover cap 22 and a lateral outlet 24 which opens to a socket 26 formed in a boss on the side of the T 20 for the reception of an end of a service pipe 28. The bottom or inlet end of T 20 is provided with an exteriorly enlarged portion, indicating generally at 30 which is saddle-shaped to furnish snug engagement with the exterior surface of a plastic main 34 and to position a throughbore of the T radially with respect to the main. Saddle 30 is also provided with ribs or pommels 32 to facilitate solvent welding and joining of the T to plastic main 34 as explained more fully hereinafter.

Solvent welding normally is accomplished by wiping the exterior surface of a plastic main free from dirt, grease and other foreign objects, as with the use of a soft rag or paper towel. Washing and drying, the use of cleaning solvents and sandpapering operations may be employed to clean and ready the main for solvent welding, but are by no means essential. The plastic service T 20 normally should be clean and ready for use if newly purchased, but the underside of the saddle portion 30 of the T may be wiped clean if it has become unnecessarily contaminated with dirt and grease through rough handling and long storage. Following any necessary cleaning operations, a suitable solvent is then applied to the desired surface of the main, as by brushing, spraying, or swabbing.

The solvent-welding operation is expedited according to the present invention by the use of hose or pipe clamps 36, the ends of which are secured together by means of screw tighteners 38. The clamps 36 encircle the main and engage over the saddle portion 30 on "seats" or horizontally disposed arcuate surfaces 42 on the upper side of the saddle portions. Following solvent treatment of a suitable and reasonably dirt-free area of main 34, the saddle 30 of T 20 is positioned on the treated area and the clamps 36 are secured about main 34 and on seats 42, followed by connection and tightening of the screw tighteners 38, as shown in FIGURES 1 and 2. In so doing, the pipe fitter or installer may then continue with positioning and solvent-welding of the service pipe 28 in the socket 26 of the T 20 prior to the actual tapping operation, secure in the knowledge that the welding and setting operation of the T 20 to main 34 will continue unhindered until completion. Clamps 36 also permit T 20 to be secured to main 34 at any desired angle, an improvement that has not been easily achieved heretofore with completely manual installations. The new arrangement is especially desirable where it is necessary to install tapping T's on overhead plastic mains.

Side slipping of T 20 and misalignment of clamps 36 on seats 42 during the initial steps of the clamping operation is prevented by means of the pommels 32 which tend to hold clamps 36 in position until they are tightly secured with the screw tighteners 38. The seats 42 of the saddle 30 may also be provided with grooves (not shown), either in addition to the pommels 32 or in place thereof, to facilitate the attachment of clamps 36, which clamps of course may be of any type. On completion of the welding operation, the clamps may be removed, very quickly in the case of pipe clamps. Disposable type clamps of plastic or fabric may also be employed which are left on the T and main after the completion of solvent-welding.

Turning now to FIGURES 3 and 4, it will be seen that the service T 20 has a throughbore 52 provided with a major portion of its axial extent with interior threads 54. At its lower end, i.e., the inlet end of the throughbore 52, the T is provided with a smooth-walled counterbore 56.

During the fabrication of the T by a molding operation, the throughbore 52 is formed by an exteriorly threaded core (not shown) which is unscrewed and removed from the inlet end of the throughbore 52 at the completion of the molding operation. As mentioned heretofore, differential shrinkage of the plastic of the T, due to varying wall thicknesses along the length of the throughbore, requires finishing of the interior threads 54 with a tap (not shown). In the present construction, the tap can be run in from the inlet or lower end of the T throughbore 52. The tap is adapted to conform as closely as possible with the configuration of the threads 54 at the lower or inlet end of the T throughbore 52. Consequently, the tap does not commence to cut the material of the plastic, i.e., to cut away any material which forms the threads 54, until the tap approaches the upper or outer end of the throughbore. Hence, no material will be cut away and thus weaken the interior threads 54 adjacent the lower or inlet end of the T throughbore wherein the interior threads 54 undergo the greatest strain, or are under the greatest load, during the operation of tapping the main 34 as described in more detail hereinafter.

The presence of the counterbore 56 also accomplishes additional objectives of the present invention. That is, due to its increased crosssectional area, the counterbore 56 provides a space for the collection of softened plastic and welding solvent, that are often squeezed out during the solvent-welding operation described above, thus preventing the previously discussed problem of having welding solvent collect in the throughbore area and interfere with cutter plug operation. Also because of the presence of the counterbore 56, there is eliminated the problem of inadvertently smearing welding solvent on the threads 54 adjacent the inlet end of the throughbore 52, causing their partial dissolution and consequent weakening. Finally, the use of counterbore 56 prevents another problem inherent in previous tapping T, i.e., the accidental wiping of cutter plug lubricant on the T base solvent-welding surface due to the essentially snug fit of the cutter plug in the throughbore and the effect it has on squeezing out excess lubricant. Any excess lubricant thus squeezed out will collect in the inverted cup shape of counterbore 56 and thus never reach the surface to be solvent-welded.

The bottom tapping fabricating operation envisioned by the present invention to clean up the threads 54 also results in further improvements over prior devices. Since the tapping die (not shown) is run in through the bottom or inlet end of the T 20, there is no need to provide an enlarged recess at the top of the T which requires subsequent closing with a retainer ring for an O-ring seal. Consequently, T 20 can be formed with an integrally molded upper restricted bore portion 84, described more fully hereinafter, which results in a stronger structure for supporting larger O-rings, permits the use of stronger plastics and thus eliminates the previously common problem of shear along the O-ring retainer ring weld line. Should a retainer ring (not shown) be desired for installation in the counterbore 56, for preventing removal of the cutter plug after assembly, this can easily be done by even a partial solvent-welding to the walls and bottom of the counterbore 56, without taking special care to prevent fluid leaks. Leaks are not a problem in counterbore 56 and such a retainer joint need not be leaktight, since it will be entirely enclosed by the larger solvent-welded joint between the T base and a surface portion of main 34. Plug 62 is disposed in the bore 52 and has an exterior thread 64 which interengages with bore thread 54. Secured to the inner end of plug 62 and coaxial therewith is a tapping cutter 66 in the form of an annular metal band. Preferably, plug 62 is also formed of plastic materials which may be the same as those employed for the production of T 20. Cutter 66 may be secured to plug 62 by radially-inwardly-extending struck-out wings 69 which are molded into the plastic material of the plug. The cutter projects beyond the end face of plug 62 a distance somewhat greater than the thickness of the wall of the main 34 and has a smooth outer surface of uniform diameter throughout its entire length, which diameter is slightly less than that of the throughbore 52. The knife edge 68 of the cutter 66 is formed with an inner bevel 72, for reasons later explained.

Coaxially fixed to the end of the plug 62 concentric with the cutter 66 is a pointed metal screw 74, the thread of which preferably is of the same pitch as that of the thread 64 on the plug. The screw may be secured to the plug 62 by having its head molded into the plastic material of the latter, as is shown in FIGURES 3 and 4 of the drawings. Preferably, screw 74 projects somewhat beyond the plane of the knife edge 68 to serve as an initial centering and steadying means for the latter during the tapping operation, later described.

Between the base of the cutter 66 and the exterior thread 64 on the plug 62, the latter is provided with a frusto-conical shoulder or surface 78. According to the improved modification of the present invention, surface 78 is adapted to sealingly engage the edge 76 of the opening 50 in the main 34 after the latter is tapped by cutter 66, all as described hereinafter. Due to the deformable plastic nature of both plug 62 and main 34, an efficient fluid seal may be provided by interengagement of plug shoulder 78 with opening edge 76 whenever the plug is screwed thereagainst.

At its outer end inwardly of the restriction 84 and adjacent thread 54, the throughbore 52 in the T 20 is provided with a circumferential groove 80 substantially rectangular in radial section. The inner diameter of the restriction 84 is at least as small as, and preferably slightly less than, the crest diameter of throughbore thread 54. Within the groove 80 and contacting the bottom thereof is disposed a resilient packing ring 86 normally circular in radial section and known in the art as an O-ring. The inner diameter of the O-ring 86, when relaxed, is somewhat less than the inner diameter of the restriction 84.

At its outer end and beyond its thread 54, the plug 62 is provided with a short smooth-walled cylindrical extension 88 having a relatively sharp peripheral end edge of greater diameter than the inner diameter of the relaxed O-ring 86 but of smaller diameter than that of the center line of a radial section of the ring, for sealing engagement with O-ring 86 as described below. The outer end of plug 62 also is provided with a coaxial non-circular socket, indicated generally at 90, similar to that of a Phillips screw, for the reception of a complementary end of a special operating tool (not shown). Outwardly of the socket 90, the outer end of the plug 62 is provided with an outwardly-flaring counterbore 96, for sealing engagement with the central boss extension 46 of cover cap 22 as shown in FIGURE 4. For the secure engagement of cover cap 22, the outer end of T 20 is provided with an exterior thread 44. In some instances, it has also been found that exterior thread 44 will provide securance for an aligning collar that may be used in conjunction with the above referred to operating tool.

That section of the throughbore 52 extending between lateral outlet 24 and O-ring 86 is of sufficient length to completely receive plug 62 and its knife 66 to thereby provide unobstructed communication between the lower inlet end of the throughbore 52 and the lateral outlet 24, when the plug is in the position shown in FIGURE 4.

After solvent welding to the plastic main 34 as above described, the T 20 will be in the position shown in FIGURE 1 with the plug 62 in the position shown in FIGURE 4. With the T 20 secured in this position on the plastic main 34, the end of a service pipe 28 is inserted into the socket 26 in the T and solvent-welded therein, as shown in FIGURES 2 to 4. Thereafter, pipe 28 may be completely installed and pressure-tested. After the service pipe 28 has been installed and tested the special operating tool is engaged with socket 90 in plug 62 and rotated by an appropriate turning tool, such as a brace (not shown). Thus, the plug 62 is screwed down until the pointed end of the screw 74 engages the plastic main 34. Continued turning and advancing movement of the plug 62 toward the main threads screw 74 into the latter, and at the same time the circular cutter 66 makes an annular cut through the main. The coupon 38, i.e., the central disc within the cut formed by the cutter 66, thus becomes threaded onto the screw 74, and at the same time, because only the inner side of the knife edge 68 of the counter 66 is bevelled, the coupon is wedged tightly within the cutter. Consequently, when the plug is unscrewed and retracted back into the throughbore 52, as is later explained, the coupon 38 is withdrawn therewith, leaving a hole 50 in the main 34, as shown in FIGURE 4. As noted above, shoulder 78 has been found to provide suitable sealing engagement with the edge 76 of the hole 50 whenever desired.

In addition to aiding the withdrawal of the coupon 38 and permanent retention of the same in the cutter 66, the bevelling of only the inner side of the knife edge 68 serves to confine strain and deformation of plastic wall of the main 34 during the cutting operation solely to the coupon. Hence, the wall of the main 34 surrounding the cut is not liable to be fractured by the cutting operation. In this same connection, it is pointed out that the knife edge 68 smoothly cuts the main 34 without the formation of any cuttings or chips which might fall into the latter and that when the coupon 38 is withdrawn, the resulting hole 50 in the main is clean-edged. It also is pointed out that after the cutter 66 has cut completely through the side wall of the main 34, as is shown in FIGURE 3 further advance of the plug 62 into the main is limited by the engagement of the lower frusto-conical surface 78 on the plug with the shoulder 76 formed by the opening 50 in the main. Hence, the plug 62 cannot be lost into the main 34 by screwing it completely out of the throughbore 52. In addition to its coupon-retaining and cutter-centering function, the screw 74 serves to hold the T tightly against a main during a tapping operation, to thus preclude breaking the solvent-weld therebetween by the reaction force of the cutter 66 on the T. Hence, it is desirable for the screw 74 to project a considerable distance beyond the knife edge 68 so as to obtain a firm grip on a main before the knife edge engages therewith.

The shank of the plug-turning tool (not shown) between its plug-engaging end and its wrench-engaging end is normally provided with a smooth cylindrical surface of slightly smaller diameter than the inner diameter of the restriction 84 and of slightly greater diameter than the inner diameter of the O-ring 86 when the latter is relaxed. Consequently, after the main 34 has been tapped and pressure escapes therefrom into the throughbore 52, the tool has tight-sealing engagement with the O-ring 86 by means of its smooth surface coacting with O-ring 86, all as shown in Patent No. 2,839,075, to positively prevent the escape of pressure fluid from the upper end of the throughbore 52 while the plug 62 is being unscrewed back to the position shown in FIGURE 4. As the plug reaches this position, its outer end 88 again engages the O-ring 86 to make a tight seal therewith, so that after the special operating tool is removed the scape of pressure fluid to the atmosphere is precluded. The tool shank restricts radial-inward flow or deformation of the O-ring 86 as the plug 62 is screwed thereagainst, to thereby automatically limit the extent of deformation of the O-ring by the plug. The desirability of such limitation will be explained later.

After the tapping operation has been completed, in order to protect the O-ring seal and to make doubly sure that no leakage takes place, a cap 22 is threadedly engaged over the outer end of the T 20, as shown in FIGURE 4. The cap is provided on its undersurface with a central circular boss 46 that has a bevel on its inner end complementary to the flared counterbore 96 in the end of plug 62. Inwardly of the bevel on the boss, the latter has a smooth cylindrical exterior surface of substantially-uniform diameter that is slightly smaller than the inner diameter of the restriction 84 but somewhat greater than the inner diameter of the O-ring 86 when the latter is relaxed. Consequently, when the cap 22 is screwed onto the service T 20, the cylindrical surface of its central boss makes sealing engagement with the inner periphery of the O-ring 86, so that, in effect, a double seal is made with the O-ring that positively precludes the escape of pressure fluid from the main to the atmosphere. In this connection, it is pointed out that the limitation of the deformation of the O-ring 86 effected by the tool shank as described above, makes it possible for the boss to enter and seal with the O-ring. It further is pointed out that the undersurface of the cap 22 tightly engages with the flat top edge of the T 20 for the formation of another seal at this point.

It also will be seen that, in the event it is desired to shut off flow from the main 34 to the service pipe 28 at any time for the purpose of effecting repairs or the like to the service pipe, the cap 22 can be removed and the special tool used to screw the plug 62 toward the main 34 until the frusto-conical surface 78 on the plug makes sealing engagement with the edge 76 of the hole 50 in the main. Thus, the flow of fluid from the main 34 into throughbore 52 can be prevented. In this connection, it is again pointed out that, during the operation of screwing and unscrewing the plug 62 between the positions shown in FIGURES 3 and 4, the engagement of the shank of a special operating tool with the O-ring 86 precludes the escape of pressure fluid from the main 34 to the atmosphere.

Particular attention is called to the importance of the O-ring 86 in providing an effective seal against escape of fluid after the service installation has been made. Plastics, though effective for their intended purpose here, expand and contract with temperature changes to a much greater degree than metals usually used in service T's. Further, plastics tend to cold flow or creep somewhat with time. Accordingly, the plug 62 and the cap 22 alone would not make an effective relatively permanent seal. With the addition of the O-ring 86, however, the tightness of the seal is unaffected by the above-mentioned characteristics of plastics.

It thus will be seen that the objects of this invention have been fully and effectively accomplished. It will be realized, however, that various changes may be made in the specific embodiment shown and described to illustrate the principles of the invention without departure from such principles. Therefore, this invention includes all modifications encompassed within the spirit and scope of the following claims.

I claim:

1. A fitting attachable to a plastic main comprising: a plastic service T having a throughbore and a lateral outlet, one end of said T being shaped for engagement with and solvent welding to the plastic main; and the corresponding end of said throughbore being an inlet end for fluid from the plastic main; an interior thread in said throughbore; a plug having an exterior thread engaged with said throughbore thread; main-perforating means fixed to one end of said plug for projection out of the inlet end of said throughbore and for cutting a sharp edged perforation in the plastic main by screwing said plug thereward;

the improvement which comprises: a smooth surfaced counterbore in the inlet end of said throughbore; said counterbore being relatively short in length and said interior thread terminating at said counterbore; said counterbore providing an area of increased cross section at said throughbore inlet end; bevelled stop means on the plug interengageable with the sharp edges of the perforation cut in the plastic main for sealing the plastic main from said throughbore; restricted bore means integral with the other end of the T for restricting the throughbore and preventing removal of the plug from said throughbore at said T other end, said counterbore permitting insertion of the plug from the throughbore inlet end; an integral saddle-shaped enlargement on said one end of the T, said saddle-shaped enlargement having a bottom end surface shaped for snug engagement with and solvent welding to said plastic main; and strap-like clamping means detachably engageable with said saddle-shaped enlargement and with the plastic main for installing the T in operative position on the plastic main.

2. The structure defined in claim 1 wherein the saddle-shaped enlargement is provided with seat-like grooves for receiving said clamping means.

No references cited.

FRANCIS S. HUSAR, *Primary Examiner.*